United States Patent
Persson

(10) Patent No.: US 11,076,740 B2
(45) Date of Patent: Aug. 3, 2021

(54) METHOD OF CONTROLLING A CIRCULATION PUMP IN AN APPLIANCE FOR WASHING AND RINSING GOODS

(71) Applicant: ELECTROLUX APPLIANCES AKTIEBOLAG, Stockholm (SE)

(72) Inventor: David Persson, Stockholm (SE)

(73) Assignee: Electrolux Appliances Aktiebolag

( * ) Notice: Subject to any disclaimer, the term of this patent is extended or adjusted under 35 U.S.C. 154(b) by 267 days.

(21) Appl. No.: 15/759,031

(22) PCT Filed: Oct. 7, 2015

(86) PCT No.: PCT/EP2015/073111
§ 371 (c)(1),
(2) Date: Mar. 9, 2018

(87) PCT Pub. No.: WO2017/059896
PCT Pub. Date: Apr. 13, 2017

(65) Prior Publication Data
US 2019/0069752 A1    Mar. 7, 2019

(51) Int. Cl.
*A47L 15/00* (2006.01)
*A47L 15/42* (2006.01)
*D06F 39/08* (2006.01)

(52) U.S. Cl.
CPC ....... *A47L 15/0049* (2013.01); *A47L 15/4225* (2013.01); *A47L 2401/08* (2013.01);
(Continued)

(58) Field of Classification Search
CPC .............. A47L 15/0049; A47L 15/0052; A47L 2501/04; A47L 2401/14; A47L 15/4225; A47L 2501/05
See application file for complete search history.

(56) References Cited

U.S. PATENT DOCUMENTS 3,766,457 A * 10/1973 Fink, Jr. .................... H02P 1/42
                                                              318/786
6,709,241 B2 * 3/2004 Sabini ................. F04D 15/0066
                                                              417/43
(Continued)

FOREIGN PATENT DOCUMENTS

DE          19630357 A1 *  2/1998  ......... A47L 15/4244
DE     102007042076        3/2009
(Continued)

OTHER PUBLICATIONS

Machine translation of DE-19630357-A1, dated Feb. 1998. (Year: 1998).*

(Continued)

*Primary Examiner* — Kevin G Lee
(74) *Attorney, Agent, or Firm* — RatnerPrestia

(57) ABSTRACT

Provided herein are an appliance and method for washing and rinsing goods. The appliance may include a circulation pump, a sensing arrangement arranged to measure an indication of circulation pump pressure or process water flow rate through the circulation pump, and a controller arranged to control operating speed of the circulation pump. The controller may be further arranged to detect that the indicated circulation pump pressure or process water flow rate through the circulation pump is insufficient, and gradually reduce operating speed of the circulation pump until the circulation pump pressure or the process water flow rate through the circulation pump is at a sufficient operational level.

11 Claims, 8 Drawing Sheets

(52) U.S. Cl.
CPC ....... *A47L 2401/14* (2013.01); *A47L 2501/04* (2013.01); *A47L 2501/05* (2013.01); *D06F 39/085* (2013.01); *D06F 39/088* (2013.01); *D06F 2202/12* (2013.01); *D06F 2204/082* (2013.01)

(56) References Cited

U.S. PATENT DOCUMENTS

2003/0034749 A1\*   2/2003   Zinke ...................... H02P 6/14
                                                                    318/440
2006/0237044 A1     10/2006  Ferguson et al.
2011/0232702 A1\*   9/2011   Fauth .................. A47L 15/0031
                                                                    134/56 D
2016/0367105 A1\*   12/2016  Cantrell .............. A47L 15/4287

FOREIGN PATENT DOCUMENTS

| DE | 102014105527 | | 4/2015 | | |
| --- | --- | --- | --- | --- | --- |
| EP | 1783264 | | 5/2007 | | |
| EP | 2388599 | A2 \* | 11/2011 | ......... | G01R 19/0092 |
| WO | WO-2005/089621 | | 9/2005 | | |
| WO | WO-2009156326 | A2 \* | 12/2009 | ......... | F04D 15/0088 |

OTHER PUBLICATIONS

International Search Report and Written Opinion of International Searching Authority for International Patent Application No. PCT/EP2015/073111 dated Nov. 13, 2015, 10 pages.

Office Action for Brazilian Application No. BR112018007020-3 dated Mar. 4, 2020, 4 pages.

\* cited by examiner

METHOD OF CONTROLLING A CIRCULATION PUMP IN AN APPLIANCE FOR WASHING AND RINSING GOODS

CROSS-REFERENCE TO RELATED APPLICATIONS

This application is a national stage application filed under 35 U.S.C. § 371 of International Application No. PCT/EP2015/073111 filed Oct. 7, 2015, which application is hereby incorporated by reference in its entirety.

TECHNICAL FIELD

The invention relates to a method of controlling a circulation pump in an appliance for washing and rinsing goods, and an appliance performing the method.

BACKGROUND

In any appliance comprising a pump for pumping liquids, where the liquid flowing to the pump is in contact with vacuum or any gas (air, water vapours, etc.), for instance a dishwasher, a lower flow of liquid to the pump than from the pump will eventually cause a pressure loss due to vacuum or gas inside the pump.

EP 1783 264 discloses a dishwasher comprising a variable speed pump adapted to recirculate water within the dishwasher and a sensor adapted to measure one or more parameters indicative of current drawn by the pump during operation. The dishwasher further comprises a controller adapted to receive input from the sensor and determine pump current from the one or more parameters indicative of current, detect ventilation if the pump current is less than a threshold, and reduce the speed of or stop the pump and/or introduce water into the dishwasher if ventilation is detected in order to reduce the effects of ventilation.

Ventilation occurs when there is not sufficient water in the pump, resulting in that the pump predominantly pumps air. Since the pump impeller is rotating in air and not water, the pump current drops. The controller aims to reduce the effects of the ventilation by firstly stepping down the pump speed, and then, if this is not sufficient for overcoming the ventilation, to stop the pump. Thereafter, the controller commences the recirculation process by turning the pump back on into its usual mode to continue recirculation.

A problem with the method of reducing the effects of circulation pump ventilation as disclosed in EP 1 783 264 is that the circulation pump stop-start procedure provides for an inexact and inflexible pump control process.

SUMMARY

An object of the present invention is to solve, or at least mitigate, this problem in the art and to provide an improved method which more closely tracks and mitigates effects of circulation pump pressure loss or reduction of liquid flow rate through the circulation pump.

This object is attained in a first aspect of the invention by a method of controlling a circulation pump in an appliance for washing and rinsing goods. The method comprises detecting insufficient circulation pump pressure or process water flow rate through the circulation pump, and gradually reducing operating speed of the circulation pump until the circulation pump pressure or the process water flow rate through the circulation pump is at a sufficient operational level.

This object is attained in a second aspect of the invention by an appliance for washing and rinsing goods. The appliance comprises a circulation pump, a sensing arrangement arranged to measure an indication of circulation pump pressure or process water flow rate through the circulation pump, and a controller arranged to control operating speed of the circulation pump. The controller is further arranged to detect that the indicated circulation pump pressure or process water flow rate through the circulation pump is insufficient and gradually reduce operating speed of the circulation pump until the circulation pump pressure or the process water flow rate through the circulation pump is at a sufficient operational level.

Hence, by detecting in a washing appliance, such as a dishwasher or a washing machine, that circulation pump pressure or process water flow rate through the circulation pump reaches an insufficient level, i. falls to a level which is considered too low, a control scheme is applied which closely tracks the falling pressure or reduced flow rate in order to restore the pressure/flow rate at a satisfactory level. The insufficient level is reached when the flow of process water from the pump exceeds the flow of process water to the pump.

Advantageously, the operating speed of the circulation pump is gradually reduced until the circulation pump pressure or the process water flow rate through the circulation pump is restored at a sufficient operational level. By gradually reducing the pump speed in a dynamic manner, thereby facilitating fine tuning of the resulting pressure/flow rate level, an adequate pump pressure or flow rate can be restored.

A number of further advantages may be attained by means of the invention, such as reduced risk of heater overheating, foaming, filter clogging, flooding, etc. Moreover, noise levels will decrease, and water consumption will be reduced if pressure/flow rate can be restored without supply of additional water to the dishwasher.

In prior art dishwashers, additional water is typically supplied when a shortage of process water is detected. Supplying additional water is however a much slower process than changing pump speed, and during the process of supplying additional water up to a sufficient level, the flow rate will be less than desired which in turn has negative effects on other parts of the dishwasher (for example overheating heating elements or inadequate filtering). With the invention, by maintaining a satisfactory pressure and flow rate, although lower than at a desired target level, the pressure/flow rate will not drop to critical levels.

In an embodiment of the invention, additional water is supplied to the dishwasher for increasing circulation pump pressure or process water flow rate through the circulation pump. Advantageously, if the reduction of circulation pump speed is combined with the supply of additional water to the dishwasher, the dishwasher will be able to return to the target level in a well-controlled manner, and the risk of pump pressure collapse is reduced.

In an embodiment of the invention, stepwise reduction of the operating speed of the circulation pump is performed, while in another embodiment the reduction is performed by ramping down the operating speed of the circulation pump. It should be noted that a combination of the two can be envisaged, where stepwise decrease is performed alternately with ramping down the speed.

In still another embodiment, the operating speed of the circulation pump is gradually increased to its target speed after the sufficient pressure/flow rate operational level $T_{OP}$ first has been reached by lowering the speed. The increasing of the speed of the pump to its target speed will advantageously result in in a well-controlled increase in pressure/flow rate to a desired target level, at which level the pressure/flow rate typically was upheld before the reduction of the pump speed was performed.

In yet an embodiment, insufficient circulation pump pressure or process water flow rate through the circulation pump is detected indirectly by measuring operating current of a motor driving the circulation pump. This may be measured by measuring the voltage of a known shunt resistor in the motor and calculating the current by using Ohm's law. Measured current can be directly translated into circulation pump torque; the higher the torque, the higher the operating current of the motor driving the pump, and a higher pump torque implies a greater flow of process water through the circulation pump. Measuring operating current of the circulation pump motor is in itself advantageous as compared to using a relatively expensive pressure or flow rate sensor to measure the pump pressure or flow of process water through the pump. With the measured operating current, it can be determined whether the pressure or flow is insufficient.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description. The washing appliance of the invention will subsequently be exemplified by a dishwasher.

Figure 1:
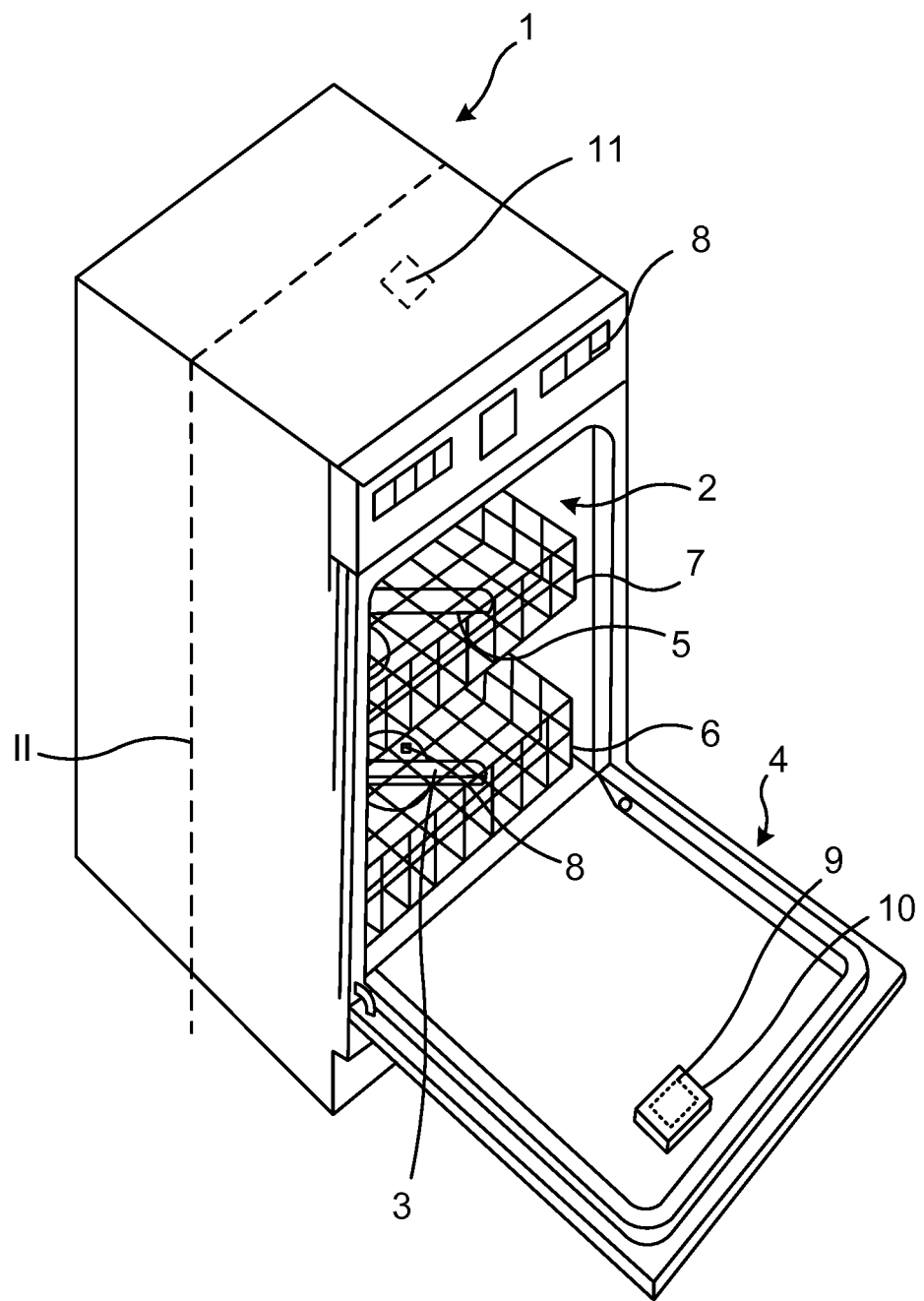
FIG. 1 shows a prior art dishwasher in which the present invention can be implemented.

FIG. 1 shows a prior art dishwasher 1 in which the present invention can be implemented. It should be noted that dishwashers can take on many forms and include many different functionalities. The dishwasher 1 illustrated in FIG. 1 is thus used to explain different embodiments of the present invention and should only be seen as an example of a dishwasher in which the present application can be applied.

The exemplifying dishwasher 1 comprises a washing compartment or tub 2, a door 4 configured to close and seal the washing compartment 2, a spraying system having a lower spray arm 3 and an upper spray arm 5, a lower rack 6 and an upper rack 7. Additionally, it may comprise a specific top rack for cutlery (not shown). A controller 11 such as a microprocessor is arranged in the interior of the dishwasher for controlling washing programmes and is communicatively connected to an interface 8 via which a user can select washing programmes.

The door 4 of the prior art dishwasher 1 illustrated in FIG. 1 is further on its inside arranged with a small detergent dispenser 9 having a lid 10 being controllably opened and closed by the controller 11 for dispensing detergent from the dispenser 9 into the tub 2.

Figure 2:
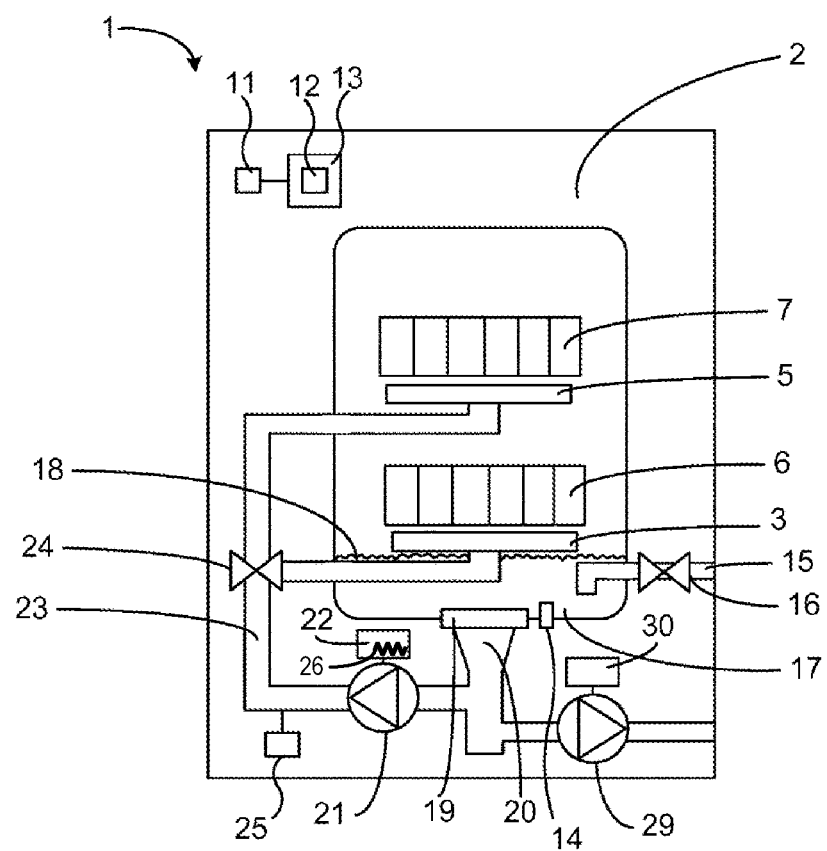
FIG. 2 schematically illustrates a cross-sectional view of the dishwasher of FIG. 1 taken along section II.

FIG. 2 schematically illustrates a cross-sectional view of the dishwasher 1 of FIG. 1 taken along section II, to further illustrate components included in a dishwasher 1. Hence, as previously mentioned, the dishwasher 1 comprises a washing compartment or tub 2 housing an upper basket 7 and a lower basket 6 for accommodating goods to be washed such as cutlery, plates, drinking-glasses, trays, etc.

Detergent in the form of liquid, powder or tablets is dosed in a detergent compartment located on the inside of a door (not shown in FIG. 2) of the dishwasher 1 by a user, which detergent is controllably discharged into the washing compartment 2 in accordance with a selected washing programme.

As previously mentioned, the operation of the dishwasher 1 is typically controlled by the controller 11 executing appropriate software 12 stored in a memory 13.

Fresh water is supplied to the washing compartment 2 via water inlet 15 and water supply valve 16. This fresh water is eventually collected in a so called sump 17, where the fresh water is mixed with the discharged detergent resulting in process water 18.

By the expression "process water" as used herein, is meant a liquid containing mainly water that is used in and circulates in a dishwasher. The process water is water that may contain detergent and/or rinse aid in a varying amount. The process water may also contain soil, such as food debris or other types of solid particles, as well as dissolved liquids or compounds. Process water used in a main wash cycle is sometimes referred to as the wash liquid. Process water used in a rinse cycle is sometimes referred to as cold rinse or hot rinse depending on the temperature in the rinse cycle. The pressurized fluid supplied to the detergent dispensing device according to embodiments of the invention thus at least partly contains process water.

At the bottom of the washing compartment is a filter 19 for filtering soil from the process water before the process water leaves the compartment via process water outlet 20 for subsequent re-entry into the washing compartment 2 through circulation pump 21. Thus, the process water 18 passes the filter 19 and is pumped through the circulation pump 21, which typically is driven by a brushless direct current (BLDC) motor 22, via a duct 23 and process water valve 24 and sprayed into the washing compartment 2 via nozzles (not shown) of a respective wash arm 3, 5 associated with each basket 6, 7. Thus, the process water 18 exits the washing compartment 2 via the filter 19 and is recirculated via the circulation pump 21 and sprayed onto the goods to be washed accommodated in the respective basket via nozzles of the wash arms 3, 5. Further, a controllable heater 14 is typically arranged in the sump 17 for heating the process water 18.

The washing compartment 2 of the dishwasher 1 is drained on process water 18 with a drain pump 29 driven by a BLDC motor 30. It should be noted that it can be envisaged that the drain pump 29 and the circulation pump 21 may be driven by one and the same motor.

A sensing arrangement 25 may be arranged at the circulation pump 21 for measuring e.g. flow rate of the process water 18 passing through the circulation pump 21. The sensing arrangement may be embodied in the form of a pressure or flow rate transducer. Alternatively, the sensing arrangement 25 may be implemented in the form of a resistor 26 arranged at the circulation pump motor 22 for measuring operation current of the motor. Practically, this is undertaken by measuring the operating voltage of a known shunt resistor in the motor 22 of the circulation pump 21 and calculating the operating current. From the measured current, it is determined whether the pressure/flow rate is sufficient or not.

Figure 3A:
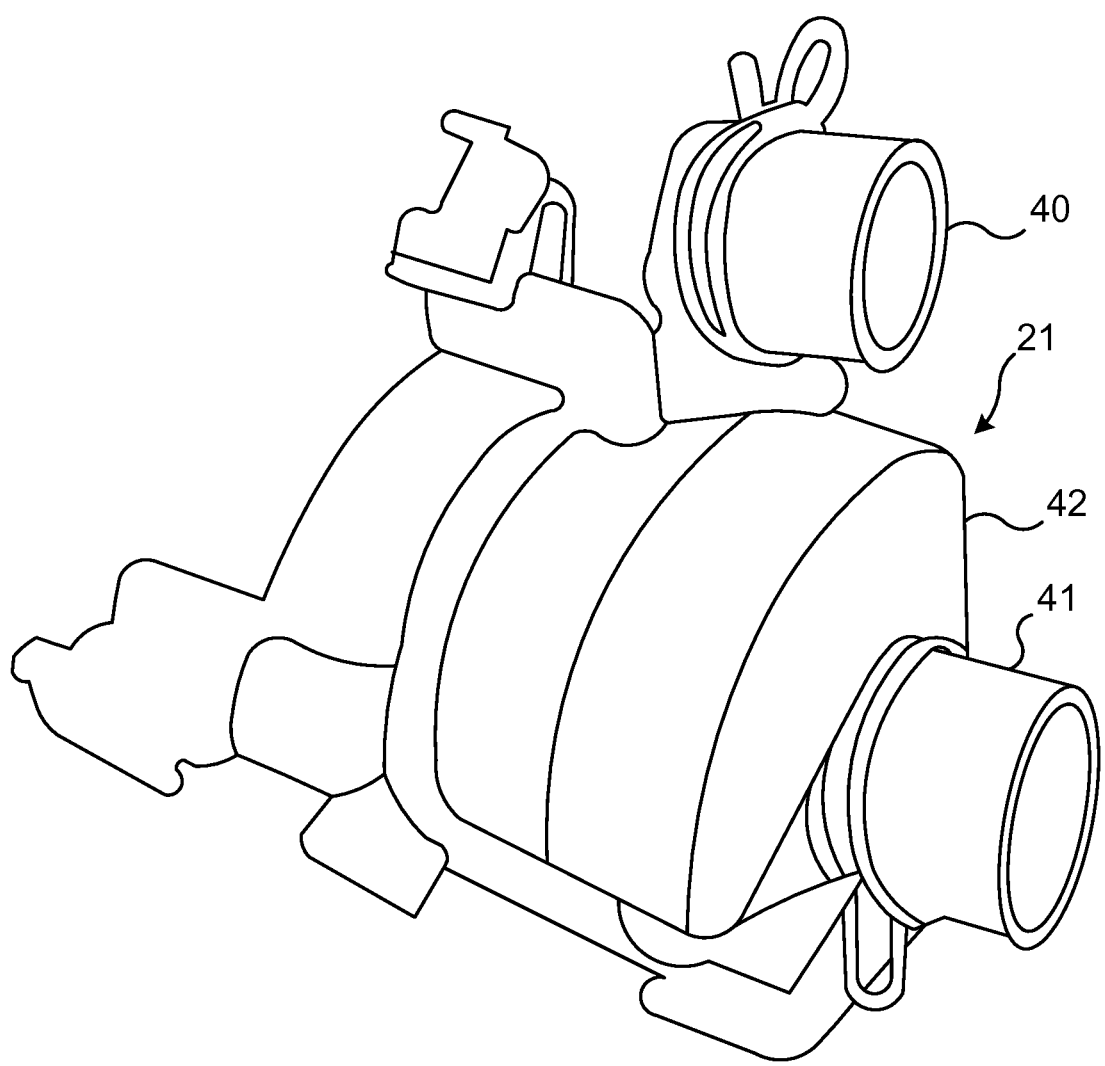
FIGS. 3a and b illustrate two different views of a circulation pump which can be controlled according to embodiments of the present invention.

FIG. 3a shows a view of a circulation pump 21 which can be controlled according to the invention. The speed of the circulation pump 21 is typically controlled by the controller 11. FIG. 3a shows an outlet 40 (referred to as a discharge port) of the circulation pump 21 and an inlet 41. The casing 42 of the circulation pump 21 is referred to as the volute and can be removed from a main body 43 of the circulation pump 21.

Figure 3B:
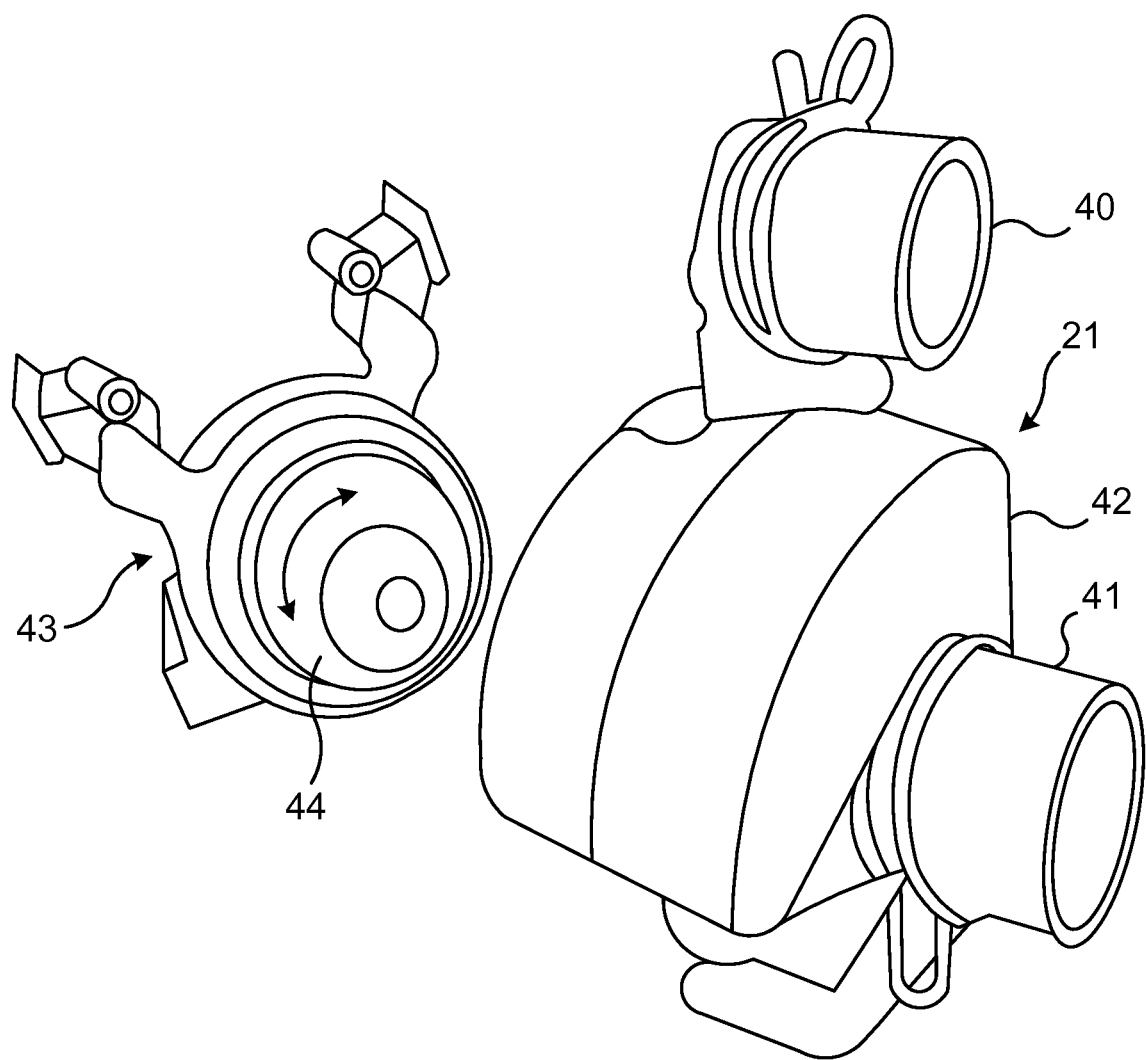

FIG. 3b shows a further view of the circulation pump 21 of FIG. 3a, where the volute 42 has been removed from the main body 43 of the circulation pump, thereby revealing the impeller 44 of the circulation pump which under operation pumps the process water that is entering the circulation pump 21 via the inlet 41. The process water that is pumped by the impeller 44 is subsequently received by the volute 42, which slows down the flow rate of the process water, and exits the circulation pump 21 via the outlet 40.

Now, as previously has been mentioned, where the process water 18 flowing to the circulation pump 21 is in contact with vacuum or any gas, for instance via an evaporator, a lower flow of process water to the pump 21 than from the pump will eventually cause a pressure loss due to vacuum or gas inside the pump 21.

In an embodiment of the invention, if such a situation occur, as detected by the sensing arrangement 25 measuring pressure loss of the pump 21 or reduction of process water flow rate through the pump 21, for instance a pressure sensor or a flow rate sensor, or by monitoring pump power consumption (low consumption indicating that the impeller 44 pumps air), the operational speed of the pump 21 will gradually be reduced until an adequate pump pressure or flow rate is restored. As previously mentioned, the controller 11 is capable of controlling the speed of the circulation pump 21, and is further configured to perform a reading of the sensing arrangement 25 to attain an indication of pressure loss or flow rate reduction.

Figure 4:
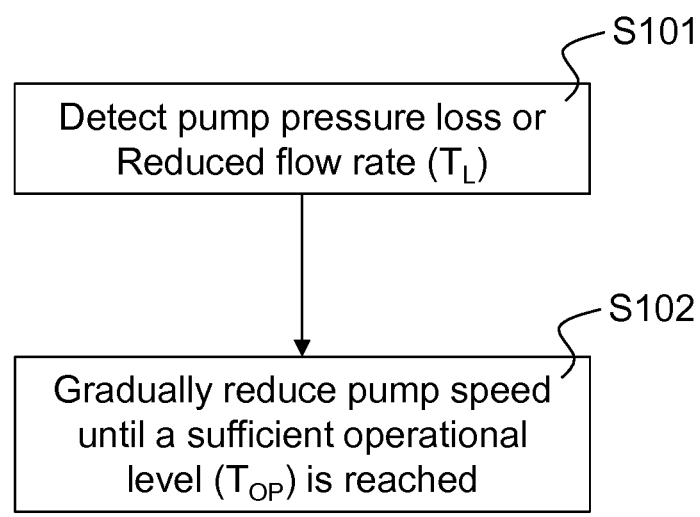
FIG. 4 shows a flowchart illustrating an embodiment of a method of controlling a circulation pump in a dishwasher according to the invention.

FIG. 4 shows a flowchart illustrating an embodiment of a method of controlling a circulation pump in a dishwasher according to the invention. Thus, the controller 11 detects in step s101, by reading the sensing arrangement 25, that circulation pump pressure or process water flow rate through the circulation pump 21 is insufficient, for instance by reaching a lower threshold level $T_L$, indicating a pressure loss or reduced flow rate. Thereafter, the controller 11 gradually reduces the operating speed of the circulation pump 21 in step S102 until the circulation pump pressure or the process water flow rate through the circulation pump 21 is at a sufficient operational level $T_{OP}$. Advantageously, by gradually reducing the pump speed, an adequate pump pressure or flow rate can be restored.

Figure 5:
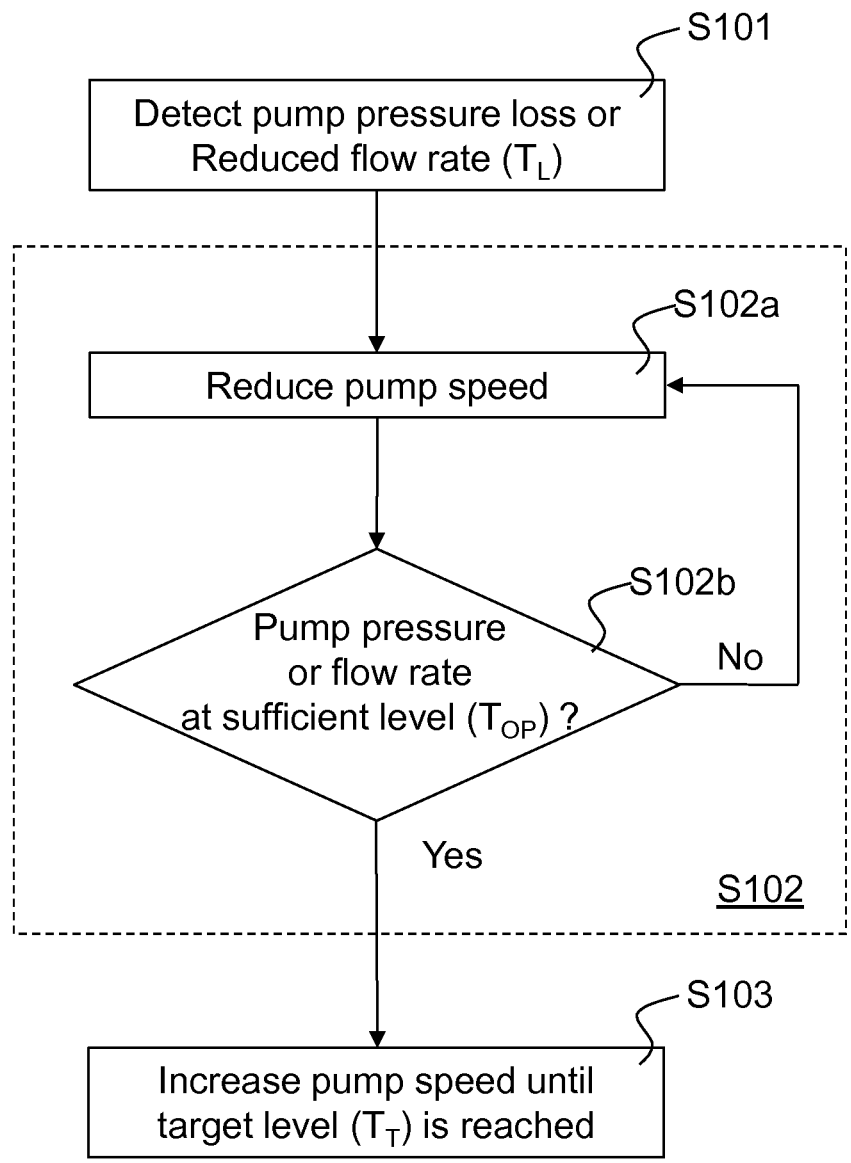
FIG. 5 shows a flowchart illustrating a further embodiment of a method of controlling a circulation pump in a dishwasher according to the invention.

FIG. 5 shows a further embodiment of the method of controlling a circulation pump in a dishwasher according to the invention, where the operating speed of the circulation pump 21 gradually is increased to a desired target speed corresponding to a desired target pressure or flow rate level $T_T$ after the sufficient pressure/flow rate operational level $T_{OP}$ first has been reached by lowering the speed. The increasing of the speed of the pump to the target speed will result in in an increase in pressure/flow rate to the target level $T_T$. Hence, $T_T > T_{OP}$. Again, the controller 11 may detect via reading of the sensing arrangement 25 in step s101 that circulation pump pressure or process water flow rate through the circulation pump is insufficient by reaching a lower threshold level $T_L$. Thereafter, the operating speed of the circulation pump is reduced in step S102a by the controller 11, and in step S102b, it is determined by reading sensing arrangement 25 whether the pressure or flow rate has reached the sufficient operational level $T_{OP}$. If not, the controller 11 will further reduce the operating speed of the circulation pump 11 until the sufficient operational level is reached. Advantageously, by gradually reducing the pump speed, an adequate pump pressure or flow rate can be restored.

Hence, the proposed method closely tracks and mitigates—or even eliminates—effects of circulation pump pressure loss or reduction of process water flow rate through the circulation pump by gradually reducing the speed of the circulation pump 21.

In the embodiment illustrated with reference to FIG. 5, after the speed of the circulation pump 21 has been reduced to a level where the pump recovers, and a satisfactory pressure or flow rate level is reached corresponding to $T_{OP}$, the controller 11 gradually increases the pump speed until the target speed is reached in step S103, i.e. the speed at which the pressure of, or flow rate through, the circulation pump 21 reaches a desired target level (which possibly coincides with the pressure/flow rate level at which the circulation pump was operated before the gradual reduction was performed in step S102).

It should be noted that a sufficient operational level is reached from $v_L$ and up; otherwise, the speed of the circulation pump is reduced from the current speed until the sufficient level is reached again.

Further, $v_T$ may be equal to $v_L$, but oftentimes (for instance when supplying water to the dishwasher) $v_L$ exceeds $v_T$, and in case there is an insufficient amount of water in the dishwasher, $v_L$ may not be reached at all.

Figure 6:
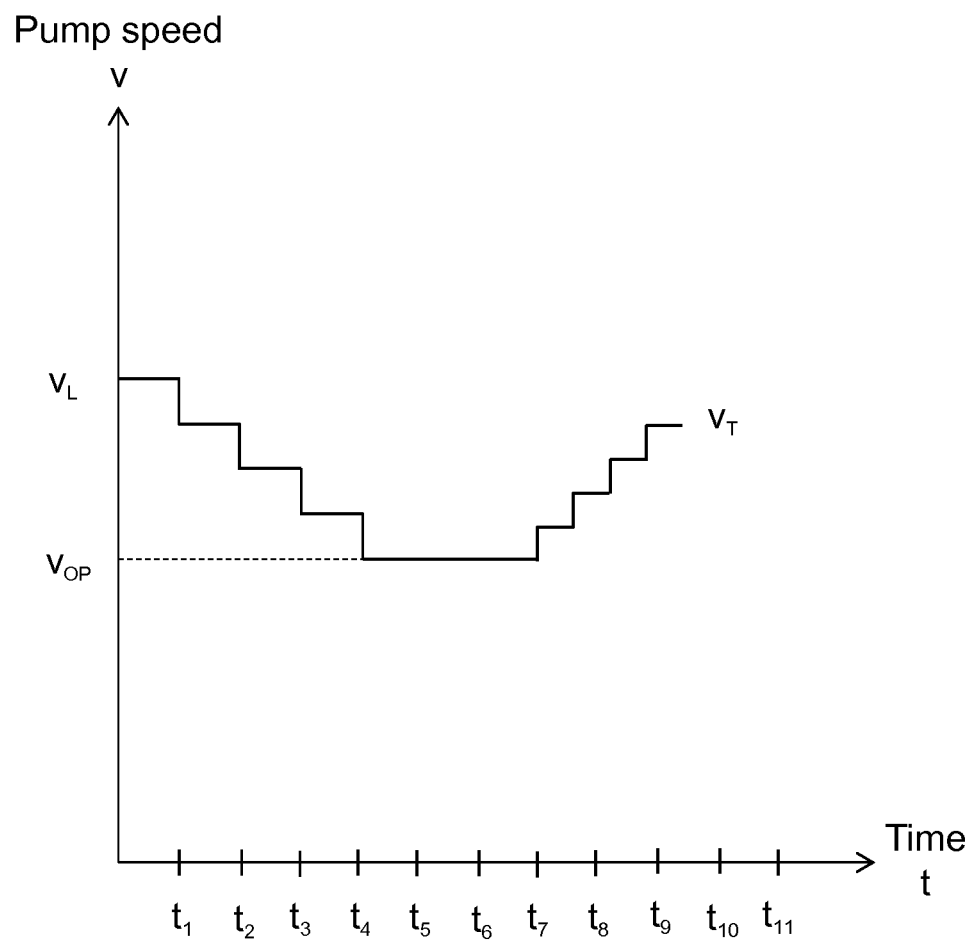
FIG. 6 illustrates a gradual stepwise reduction of circulation pump speed until a satisfactory pressure or flow rate is restored, and a subsequent speed increase.

FIG. 6 illustrates the gradual reduction of the circulation pump speed $v$ until a satisfactory pressure or flow rate is restored. Thus, the controller 11 detects that circulation pump pressure or process water flow rate through the circulation pump 21 reaches an insufficient level, e.g. a lower threshold level $T_L$, corresponding to a pump speed $v_L$. Thereafter, the controller 11 gradually reduces the operating speed of the circulation pump 21 in step S102 until the circulation pump pressure or the process water flow rate through the circulation pump 21 is at a sufficient operational level $T_{OP}$, which corresponds to a reduced pump speed $v_{OP}$. As is illustrated, the gradual reduction is performed by means of stepwise reduction of the speed. Hence, a first reducing step is performed at time $t_1$, a second reducing step is performed at time $t_2$, and so on, until the pump speed $v_{OP}$, corresponding to the level $T_{OP}$ where a satisfactory pressure or flow rate is attained.

In this particular exemplifying embodiment, the speed of the circulation pump 21 is held at $v_{OP}$ for a time period, until the controller 11 performs a stepwise increase of the pump speed at time $t_7$ until the target speed of the pump has been reached at $v_T$. It should be noted that at this pump speed the pressure/flow rate level $T_T$ is higher than the pressure/flow rate level $T_L$, where the controller 11 started to perform a reduction of the pump speed.

Figure 7:
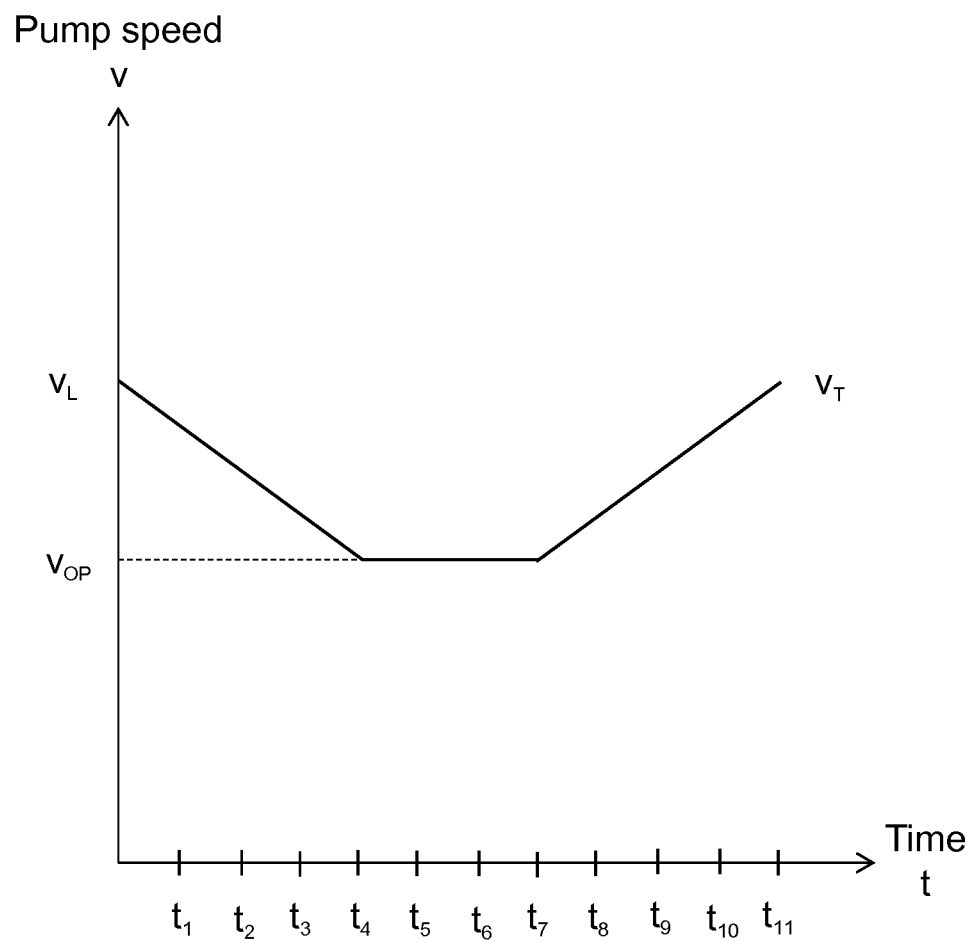
FIG. 7 illustrates a gradual ramping down stepwise reduction of circulation pump speed until a satisfactory pressure or flow rate is restored, and a subsequent speed increase.

FIG. 7 illustrates the gradual reduction of the circulation pump speed v until a satisfactory pressure or flow rate is restored, but where a ramping down (and ramping up) of the operating speed of the circulation pump 21 is performed instead of a stepwise decrease/increase of the speed.

It should be noted that a combination of the two can be envisaged, where stepwise decrease/increase is performed alternately with ramping down/up the speed. It should further be noted that a direct increase of the pump speed can be envisaged, i.e. instead of stepwise increase/ramping up of the pump speed at time $t_7$ a more or less instant speed increase from speed $v_{OP}$ to speed $v_T$ is performed.

With reference again to FIG. 2, in still a further embodiment of the invention, the reduction of the speed of the circulation pump 21 may be combined with the supply of fresh water to the washing compartment 2 via water inlet 15 and water supply valve 16. This fresh water is eventually collected in a so called sump 17, where the fresh water is mixed with the discharged detergent resulting in process water 18 subsequently entering the circulation pump 21, which advantageously will facilitate an increase in pump pressure/flow rate at the circulation pump 21.

In practice, the steps of the method performed by the dishwasher 1 according to embodiments of the invention, is caused by the controller 11 embodied in the form of one or more microprocessors or processing units arranged to execute a computer program 12 downloaded to a suitable storage medium 13 associated with the microprocessor, such as a Random Access Memory (RAM), a Flash memory or a hard disk drive. The controller 11 is arranged to cause the dishwasher 1 to carry out at the steps of the method according to embodiments of the present invention when the appropriate computer program 12 comprising computer-executable instructions is downloaded to the storage medium 13 and executed by the controller 11. The storage medium 13 may also be a computer program product comprising the computer program 12. Alternatively, the computer program 12 may be transferred to the storage medium 13 by means of a suitable computer program product, such as a Digital Versatile Disc (DVD) or a memory stick. As a further alternative, the computer program 12 may be downloaded to the storage medium 13 over a network. The controller 11 may alternatively be embodied in the form of a digital signal processor (DSP), an application specific integrated circuit (ASIC), a field-programmable gate array (FPGA), a complex programmable logic device (CPLD), etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An appliance for washing and rinsing goods, comprising:
   a circulation pump;
   a sensing arrangement arranged to measure an indication of circulation pump pressure or process water flow rate through the circulation pump, wherein the sensing arrangement being arranged to measure operating current of a motor driving the circulation pump in order to attain an indication of circulation pump pressure or process water flow rate through the circulation pump; and
   a controller arranged to control operating speed of the circulation pump, wherein the controller further is configured to:
      detect that the indicated circulation pump pressure or process water flow rate through the circulation pump is insufficient;
      select a reduction process from the group consisting of (a) ramping down the operating speed of the circulation pump, (b) a stepwise reduction of the operating speed of the circulation pump comprising a plurality of reducing steps, and (c) a combination of ramping down the operation speed and stepwise reduction of the operating speed of the circulation pump; and
      reduce operating speed of the circulation pump via the selected reduction process until the indicated circulation pump pressure or the process water flow rate through the circulation pump is at a sufficient operational level ($T_{OP}$).

2. The appliance of claim 1, the controller further being arranged to, when reducing the circulation pump operating speed:
   reduce the operating speed of the circulation pump; and
   determine whether the circulation pump pressure or the liquid flow rate through the circulation pump is at the sufficient operational level ($T_{OP}$), wherein further reduction of the operating speed of the circulation pump is performed unless the sufficient operational level ($T_{OP}$) is reached.

3. The appliance of claim 1, wherein the controller is arranged to perform a stepwise reduction of the operating speed of the circulation pump.

4. The appliance of claim 1, wherein the controller is arranged to perform a ramping down reduction of the operating speed of the circulation pump.

5. The appliance of claim 1, the controller further being arranged to:
   increase the operating speed of the circulation pump until the circulation pump pressure or process water flow rate trough the circulation pump is at a desired target operational level ($T_T$) following the reduction of the operating speed of the circulation pump.

6. The appliance of claim 5, further comprising:
   an inlet for supplying water to the appliance; and
   a water supply valve for controlling the supply of water via the inlet,
   the controller further being arranged to control the water supply valve for supplying additional water to the appliance to increase circulation pump pressure or process water flow rate through the circulation pump, wherein the appliance is configured to supply the additional water to the appliance in an instance in which the controller is reducing the operating speed of the circulation pump.

7. The appliance of claim 5, wherein the controller is arranged to perform a stepwise increase of the operating speed of the circulation pump.

8. The appliance of claim 1, further comprising:
an inlet for supplying water to the appliance; and
a water supply valve for controlling the supply of water via the inlet,
the controller further being arranged to control the water supply valve for supplying additional water to the appliance to increase circulation pump pressure or process water flow rate through the circulation pump.

9. The appliance of claim 1, said appliance comprising a dish washer or a washing machine.

10. An appliance comprising a dish washer or a washing machine for washing and rinsing goods, comprising:
a circulation pump;
a sensing arrangement arranged to measure an indication of circulation pump pressure or process water flow rate through the circulation pump, wherein the sensing arrangement comprises a resistor arranged in a motor driving the circulation pump, through which resistor operating current of the motor is measured, in order to attain an indication of circulation pump pressure or process water flow rate through the circulation pump; and a controller arranged to control operating speed of the circulation pump, wherein the controller further is arranged to:
detect that the indicated circulation pump pressure or process water flow rate through the circulation pump is insufficient;
select a reduction process from the group consisting of (a) ramping down the operating speed of the circulation pump, (b) a stepwise reduction of the operating speed of the circulation pump comprising a plurality of reducing steps, and (c) a combination of ramping down the operation speed and stepwise reduction of the operating speed of the circulation pump; and to
reduce operating speed of the circulation pump using the selected reduction process until the indicated circulation pump pressure or the process water flow rate through the circulation pump is at a sufficient operational level ($T_{OP}$).

11. The appliance of claim 10, wherein reducing the operating speed of the circulation pump comprises alternating ramping down the operating speed of the circulation pump with stepwise reduction of the operating speed of the circulation pump.

* * * * *